Figure 1:
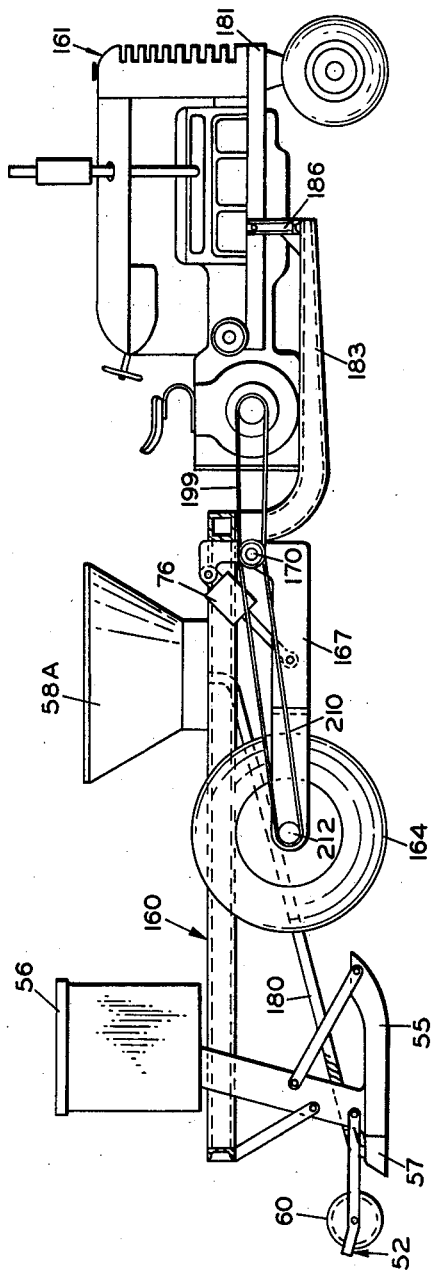

INVENTORS
NORMAN E. WATSON
JOHN W. WATSON
BY
Schmieding and Fultz
ATTORNEYS 3,144,843
MINIMUM TILLAGE PLANTER
Norman E. Watson and John W. Watson, both of R.F.D. 3, London, Ohio
Filed Sept. 11, 1959, Ser. No. 839,988
7 Claims. (Cl. 111—52)

This invention relates to apparatus for planting seeds.

This application is a continuation-in-part of my co-pending application Serial No. 823,449 filed June 29, 1959, now Patent No. 3,037,470.

In general, the planter apparatus of the present invention is adapted to automatically plant seeds in spaced rows by a novel method which will be referred to herein as minimum tillage planting. This type of planting consists of forming compacted spaced bands of earth along the surface of a field with intermediate wider bands of non-compacted earth intermediate said compacted bands.

The seed is next planted only in the compacted rows, the loosely plowed intermediate non-compacted bands of earth serving to receive and retain rain water and effectively deliver same to the adjacent compacted bands whereby the seeds and plants will be effectively provided with water throughout the growing season.

As one important advantage, minimum tillage planting results in the rapid germination of the seed. This type of planting provides relatively narrow seed beds of compacted earth from which entrapped air has been removed. The seeds are placed on the prepared seed bed and osmotic action causes the moisture present in the earth to move upwardly in the compacted seed beds and into contact with the seeds. Since the seeds are in contact with moist earth the seeds germinate immediately after planting instead of waiting for the arrival of the next rain.

As another important advantage of minimum tillage planting each seed bed which is properly prepared for rapid germination has on each side of it an uncompacted root bed that permits rain to penetrate to the roots of the plants throughout the growing season. In addition, since the soil in the uncompacted root beds is not worked after plowing air will be entrained. Such entrained air is necessary for the growth of beneficial bacteria on the roots of the plant as they spread out into the root beds during the growing season.

As still another advantage of minimum tillage planting the relatively wide uncompacted root beds provide a poor environment for the germination of weed seeds since the sub-surface moisture cannot work upwardly through the uncompacted soil by osmotic action.

In the instance of corn planting the seeds need a seed bed for approximately ten days and a root bed for approximately six months' growing season. Hence it will be understood that minimum tillage planting, and apparatus constructed according to the present invention, conditions the field to take care of the specific requirements of both the germinating seed and the growing plants.

The apparatus of the present invention comprises a modification of the apparatus disclosed in my co-pending application Serial No. 823,449 filed June 29, 1959 wherein the planter is constructed as a self-propelled machine. The particular self-propelled machine illustrated herein is in the form of a main planter frame that is rigidly attached to the frame of a farm tractor, said tractor having the rear wheels removed. A drive mechanism connects the rear axle of the farm tractor with a plurality of ground engaging portions or compacting and supporting wheels mounted on the main frame, said wheels serving to support the rear portion of the self-propelled assembly.

It has been discovered, in accordance with the present invention, that self-propelled planters incorporating driving means for driving the compacting wheels which in turn propel the planter are even more effective than minimum tillage planters of the type that are drawn through a field. It is believed that these superior results are achieved by a more effective compacting of the earth which results from the application of torque to the compacting wheels.

In the various embodiments of the present invention a plurality of laterally spaced compacting wheels are mounted on the rear of the frame at distances equal to the spacings between the compacted rows to be formed in accordance with the previously mentioned minimum tillage planting procedure. Moreover, the compacting wheels are utilized to support a substantial portion of the weight of the planter apparatus whereby the weight of the apparatus is utilized to achieve a high degree of compacting of the earth.

The rear portion of the planter frame carries a plurality of seed dispensing means laterally spaced at distances equal to the spacings between the compacting wheels that follow whereby each compacting wheel is followed by a respective longitudinally aligned seed dispensing means.

For purposes of breaking up large clumps of earth present in the plowed field prior to planting, a plurality of hoe means are mounted to the forward portion of the planter frame and each of said hoe means leads and is longitudinally aligned with a respective one of said compacting wheels.

In the case of machines constructed according to the present invention wherein more than two rows are to be planted, each of the compacting wheels is attached to the frame by a mount that includes a pressure equalizing means for maintaining substantially equal pressure between the compacting wheels and the ground notwithstanding variations in the vertical positions of the compacting wheels.

It is therefore an object of the present invention to provide a self-propelled planter apparatus for minimum tillage planting that automatically plants seed in spaced compacted bands of earth separated by intermediate bands of non-compacted earth to more effectively water the seed and growing crop and thereby achieve increased yield per acre.

It is another object of the present invention to provide a self-propelled planter apparatus of the type described that includes a plurality of laterally spaced compacting wheels, longitudinally aligned with a plurality of seed dispensing means that follow, said wheels being arranged to engage the earth with substantially equal pressure notwithstanding variations in the surface level of the earth whereby spaced equally compacted bands of earth are formed by the compacting wheels.

It is another object of the present invention to provide a self-propelled planter apparatus of the type described that includes a plurality of laterally spaced compacting wheels that engage the surface of the earth with substantially equal pressure, a plurality of spaced seed dispensing means each of which follows a respective compacting wheel and is provided with a shoe for forming a furrough, and means for vertically adjusting the height of said shoes relative to said compacting wheels.

It is another object of the present invention to provide a self-propelled planter apparatus of the type described that utilizes the weight of the planter apparatus to achieve a high degree of compacting of the earth at the compacting wheels.

It is another object of the present invention to provide a self-propelled planter apparatus of the type described that is driven in part by applying engine torque to the same wheels that are used to form the compacted bands of earth whereby more effective compacting action is achieved.

It is still another object of the present invention to provide a self-propelled minimum tillage planter that includes an auxiliary frame portion that is mounted to the frame of a tractor, said tractor having the rear wheels removed. The auxiliary frame is provided with a plurality of compacting wheels that also serve the function of supporting the rear portion of the weight of the assembly, said compacting wheels being driven from the rear axle of the tractor.

Further objects and advantages of the present invention will be apparent from the following description reference being had to the accompanying drawings wherein a preferred form of embodiment of the invention is clearly shown.

Figure 2:
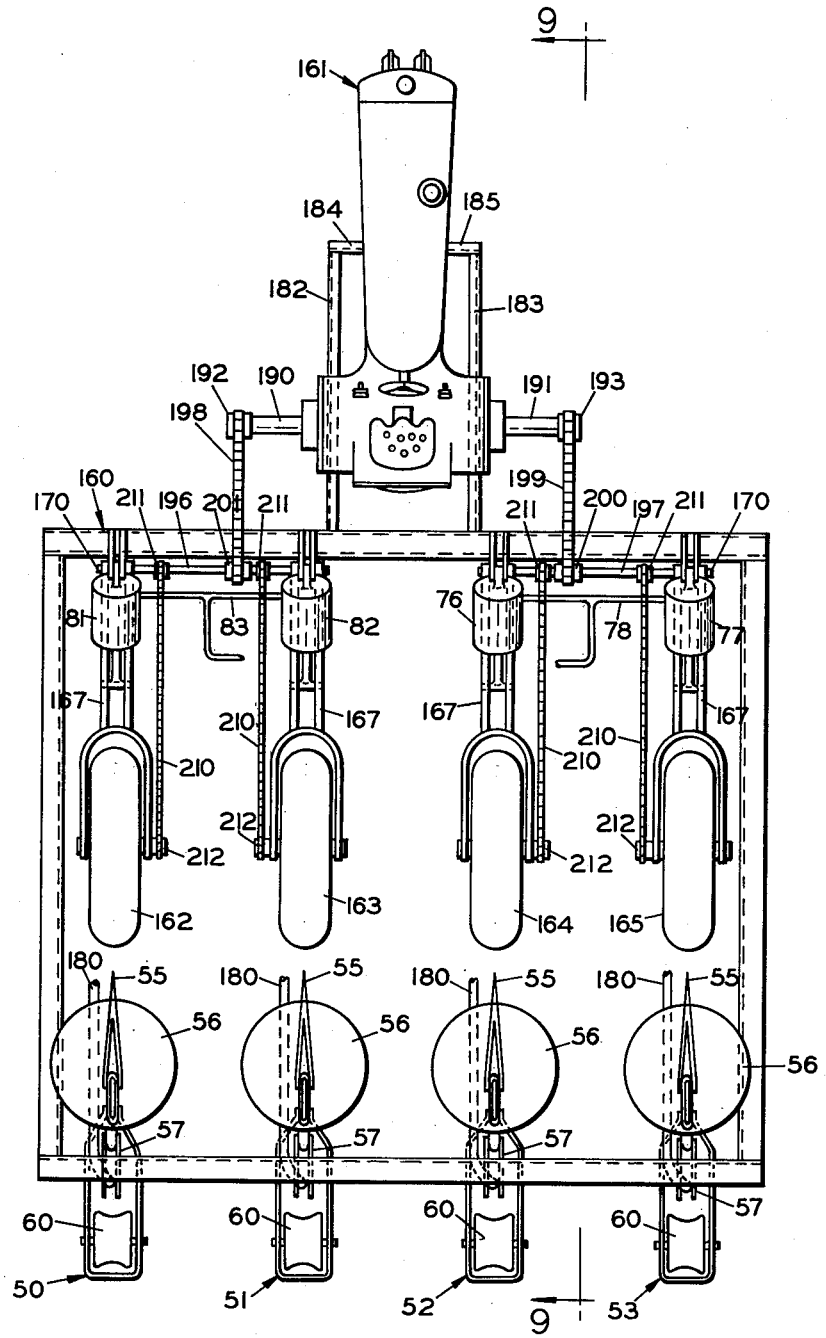

In the drawings:

FIG. 1 is a side elevational view of a self-propelled planter apparatus constructed according to the present invention; and FIG. 2 is a top elevational view of the planter apparatus of FIG. 1.

Referring in detail to the drawings, FIGS. 1 and 2 illustrate a self-propelled planter constructed in accordance with the present invention.

The apparatus of FIGS. 1 and 2 includes a frame means indicated generally at 160 that is attached to a farm tractor indicated generally at 161.

A plurality of compacting wheels 162–165 are mounted to the arms 167 which are in turn pivoted to frame 160 at the pivots 170. A plurality of fluid motors 76, 77, 81, and 82 are operatively interconnected between wheels 162–165 and frame 160. Fluid motors 81 and 82 are interconnected by a line 83 and fluid motors 76 and 77 are interconnected by a line 78. A planter is driven across the field and one of the wheels, for example, wheel 164 encounters a high stretch of ground then wheel 164 will rise relative to the frame and wheel 165 will drop relative to the frame since hydraulic fluid is free to pass from hydraulic cylinder 76 through line 78 to power cylinder 77. The same function occurs between the left pair of compacting wheels 162 and 163 since their respective hydraulic cylinders 81 and 82 are interconnected by line 82.

Each of the compacting wheels 162–165 is followed by a respective seed dispensing means indicated generally at 50–53. Each seed dispensing means includes a seed hopper 56 that communicates with a seed releasing mechanism 57, the latter being located behind the vertically moveable shoes 55. The seed dispensing means also include furrough closing means 60 in the form of rotatable drums each of which follows a respective shoe 55. This structural arrangement is notoriously old in the art. Examples of such vertically moveable machine structures are available in Patent No. 1,021,379 to Schutt and Patent No. 492,255 to Ashurst.

Frame 20 supports a plurality of fertilizer hoppers 58-A mounted centrally of the frame and provided with outlet tubes 180 that release fertilizer at a location adjacent the outlets of the seed releasing mechanisms 57.

Frame 160 is mounted to tractor frame 181 by the longitudinal members 182 and 183, transverse members 184–185 and vertical members 186.

With reference to FIG. 2 the rear wheels are removed from tractor 161 and rear axles 190 and 191 carry sprockets 192 and 193 that drive shafts 196 and 197 via chains 198 and 199 and sprockets 200 and 201. Each of the compacting wheels 162–165 is driven from the shaft 196 or 197 by means of a chain 210 and sprockets 211 and 212.

It should be pointed out that the centers of shafts 196 and 197 coincide with the pivots 170 of the arms 167 such that the distance between the centers of sprockets 211 and 212 remain constant notwithstanding variations in the elevation of compacting wheels 162–165.

While the form of embodiment of the present invention as herein disclosed constitutes a preferred form, it is to be understood that other forms might be adopted, all coming within the scope of the claims which follow:

We claim:

1. A self-propelled minimum tillage planter comprising, in combination, a frame; front wheels for said frame; steering means for said front wheels; a forwardly facing seat rearwardly of said steering means; a plurality of laterally spaced seed dispensing means mounted on said frame for dispensing seed in parallel paths in the direction of travel of said planter; a plurality of rear frame supporting means including compacting wheels mounted forwardly of said seed dispensing means and confined to substantial alignment with said paths for supporting said frame and compacting said paths of said seed dispensing means; mounting means vertically movably attaching each of said supporting means to said frame including pressure equalizing means for maintaining substantially equal pressure between each of said compacting wheels and the ground notwithstanding variations in the vertical positions of said compacting wheels; an engine mounted on said frame means; and driving means connecting said engine with certain of said compacting wheels.

2. The planter defined in claim 1 that includes a plurality of furrough closing means mounted to said frame rearwardly of said compacting wheels.

3. A self-propelled minimum tillage planter comprising, in combination, a frame; front wheels for said frame; steering means for said front wheels; a forwardly facing seat rearwardly of said steering means; a plurality of laterally spaced seed dispensing means mounted rearwardly on said frame for dispensing seed in parallel paths in the direction of travel of said planter; a plurality of rear frame supporting means mounted forwardly on said frame including compacting wheels mounted forwardly of said seed dispensing means and confined to substantial alignment with said paths for supporting said frame and compacting said paths of said seed dispensing means; mounting means vertically movably attaching each of said supporting means of said frame including pressure equalizing means for maintaining substantially equal pressure between each of said compacting wheels and the ground notwithstanding variations in the vertical positions of said compacting wheels; an engine mounted on said frame means; and driving means connecting said engine with certain of said compacting wheels.

4. A self-propelled minimum tillage planter comprising, in combination, a frame; front wheels for said frame; steering means for said front wheels; a forwardly facing seat rearwardly of said steering means; a plurality of laterally spaced seed dispensing means mounted on said frame for dispensing seed in parallel paths in the direction of travel of said planter; a plurality of rear frame supporting means including compacting wheels mounted forwardly of said seed dispensing means and confined to substantial alignment with said paths for supporting said frame and compacting said paths of said seed dispensing means; mounting means vertically movably attaching each of said supporting means to said frame, said mounting means including a plurality of hydraulic cylinders, each of said cylinders being connected between one of said supporting means and said frame and including a chamber; and conduit means connecting said chambers of said hydraulic cylinders.

5. A self-propelled minimum tillage planter comprising, in combination, a tractor including a tractor frame; front wheels on the tractor frame; steering means for said front wheels; a forwardly facing seat rearwardly of said steering means; a rear axle on the tractor frame; an engine on the tractor frame for driving said rear axle; a planter frame rigidly attached to said tractor frame; a plurality of laterally spaced seed dispensing means mounted on said planter frame for dispensing seed in parallel paths in the direction of travel of said planter; a plurality of supporting means on said planter frame including compacting wheels confined to substantial alignment with said paths for supporting said planter frame and compacting said paths of said seed dispensing means, the weight of the rear portion of said tractor frame being imposed on said compacting wheels; mounting means vertically movably attaching each of said supporting means to said planter frame including pressure equalizing means for maintaining substantially equal pressure between each of said compacting wheels and the ground notwithstanding variations in the vertical positions of said compacting wheels; and driving means connecting said rear axle of said tractor with certain of said compacting wheels.

6. The planter defined in claim 5 that includes a plurality of furrough closing means mounted to said frame rearwardly of said compacting wheels.

7. A self-propelled minimum tillage planter comprising, in combination, a tractor including a tractor frame; front wheels on the tractor frame; steering means for said front wheels; a forwardly facing seat rearwardly of said steering means; a rear axle on the tractor frame; an engine on the tractor frame for driving said rear axle; a planter frame rigidly attached to said tractor frame; a plurality of laterally spaced seed dispensing means mounted on said planter frame for dispensing seed in parallel paths in the direction of travel of said planter; a plurality of supporting means on said planter frame including compacting wheels confined to substantial alignment with said paths for supporting said planter frame and compacting said paths of said seed dispensing means, the weight of the rear portion of said tractor frame being imposed on said compacting wheels; mounting means vertically movably attaching each of said supporting means to said planter frame, said mounting means including a plurality of hydraulic cylinders, each of said cylinders being connected between one of said supporting means and said planter frame and including a chamber; conduit means connecting said chambers of said hydraulic cylinders; and driving means connecting said rear axle of said tractor with certain of said compacting wheels.

References Cited in the file of this patent

UNITED STATES PATENTS

| | | |
|---|---|---|
| 1,282,124 | Phillips | Oct. 22, 1918 |
| 1,370,777 | Barry | Mar. 8, 1921 |
| 1,941,143 | Wickersham | Dec. 26, 1933 |
| 2,365,387 | Briscoe | Dec. 19, 1944 |
| 2,561,614 | Dixon | July 24, 1951 |
| 2,750,204 | Ohrmann | June 12, 1956 |
| 2,777,709 | Tucker | Jan. 15, 1957 |
| 2,930,335 | Hage | Mar. 29, 1960 |

OTHER REFERENCES

Successful Farming, Vol. 54, No. 12, December 1956 (pages 34 and 35 relied on).